(12) United States Patent  
Mudulodu

(10) Patent No.: US 11,627,531 B2
(45) Date of Patent: Apr. 11, 2023

(54) WLAN RECEIVER EARLY POWER DOWN BASED ON CENTER FREQUENCY OFFSET DETECTION

(71) Applicant: Silicon Laboratories, Inc., Austin, TX (US)

(72) Inventor: Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 221 days.

(21) Appl. No.: 17/106,109

(22) Filed: Nov. 29, 2020

(65) Prior Publication Data

US 2022/0174605 A1 Jun. 2, 2022

(51) Int. Cl.
*H04W 52/02* (2009.01)
*H04L 27/26* (2006.01)

(52) U.S. Cl.
CPC ..... *H04W 52/0238* (2013.01); *H04L 27/2613* (2013.01)

(58) Field of Classification Search
None
See application file for complete search history.

(56) References Cited

U.S. PATENT DOCUMENTS

| | | | | |
|---|---|---|---|---|
| 9,742,412 B1* | 8/2017 | Murali | | H04W 52/0229 |
| 9,935,794 B1* | 4/2018 | Cao | | H04L 5/0048 |
| 10,820,270 B2* | 10/2020 | Murali | | H04W 52/0229 |
| 11,082,270 B1* | 8/2021 | Wu | | H04L 1/20 |
| 2009/0154627 A1* | 6/2009 | Park | | H04L 27/2659 375/365 |
| 2010/0061402 A1* | 3/2010 | van Zelst | | H04L 5/1438 370/474 |
| 2010/0118990 A1* | 5/2010 | Lee | | H04L 27/2656 375/260 |
| 2010/0208783 A1* | 8/2010 | Lin | | H04L 27/2675 370/345 |
| 2017/0324587 A1* | 11/2017 | Lin | | H04B 1/7136 |
| 2018/0083747 A1* | 3/2018 | Doan | | H04B 7/0452 |
| 2018/0248722 A1* | 8/2018 | Wicaksana | | H04L 27/0014 |
| 2019/0059055 A1* | 2/2019 | Murali | | H04W 52/0229 |
| 2019/0159220 A1* | 5/2019 | Elsherif | | H04W 28/0278 |
| 2019/0191373 A1* | 6/2019 | Mudulodu | | H04B 1/16 |
| 2019/0223102 A1* | 7/2019 | Murali | | H04W 52/0229 |
| 2019/0356520 A1* | 11/2019 | Silverman | | H04L 25/03828 |
| 2019/0394730 A1* | 12/2019 | Vijayan | | H04L 27/0008 |
| 2020/0287672 A1* | 9/2020 | Namboodiri | | H04L 27/2623 |
| 2022/0239532 A1* | 7/2022 | Niewczas | | H04W 12/03 |

\* cited by examiner

*Primary Examiner* — Nicholas Sloms
(74) *Attorney, Agent, or Firm* — File-EE-Patents.com; Jay A. Chesavage

(57) ABSTRACT

A wireless local area network (WLAN) station receiver has a center frequency offset (CFO) estimator and an CFO table with an association between a CFO value from a recently received access point packet for which the station is associated according to 802.11. The receiver performs a comparison between the CFO estimate of the received packet and the CFO value from the CFO database, and powers the receiver down if the comparison exceeds a threshold. The threshold may be an absolute value in parts per million, or may include a time drift compensation component.

20 Claims, 4 Drawing Sheets

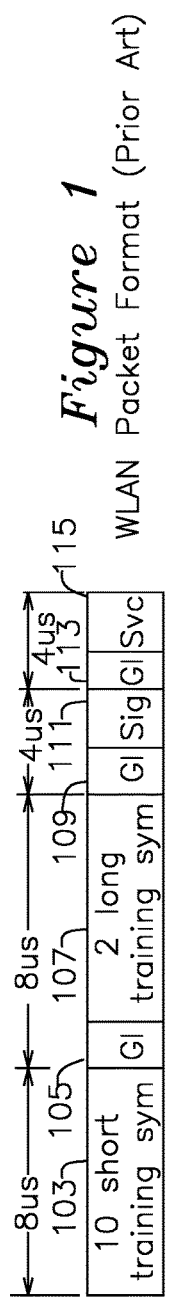
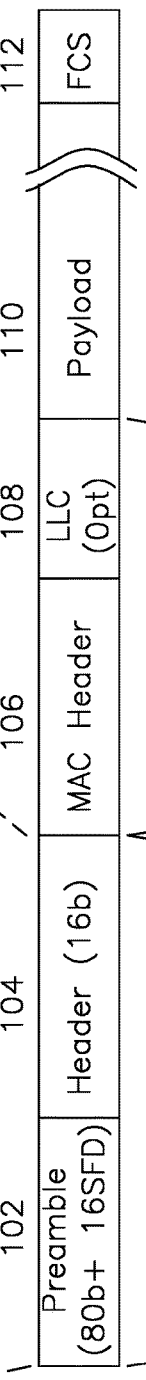
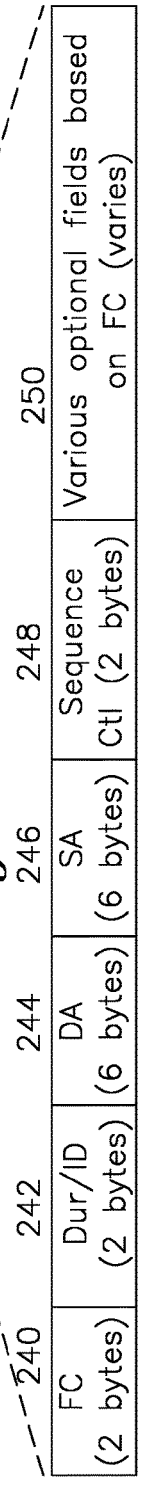

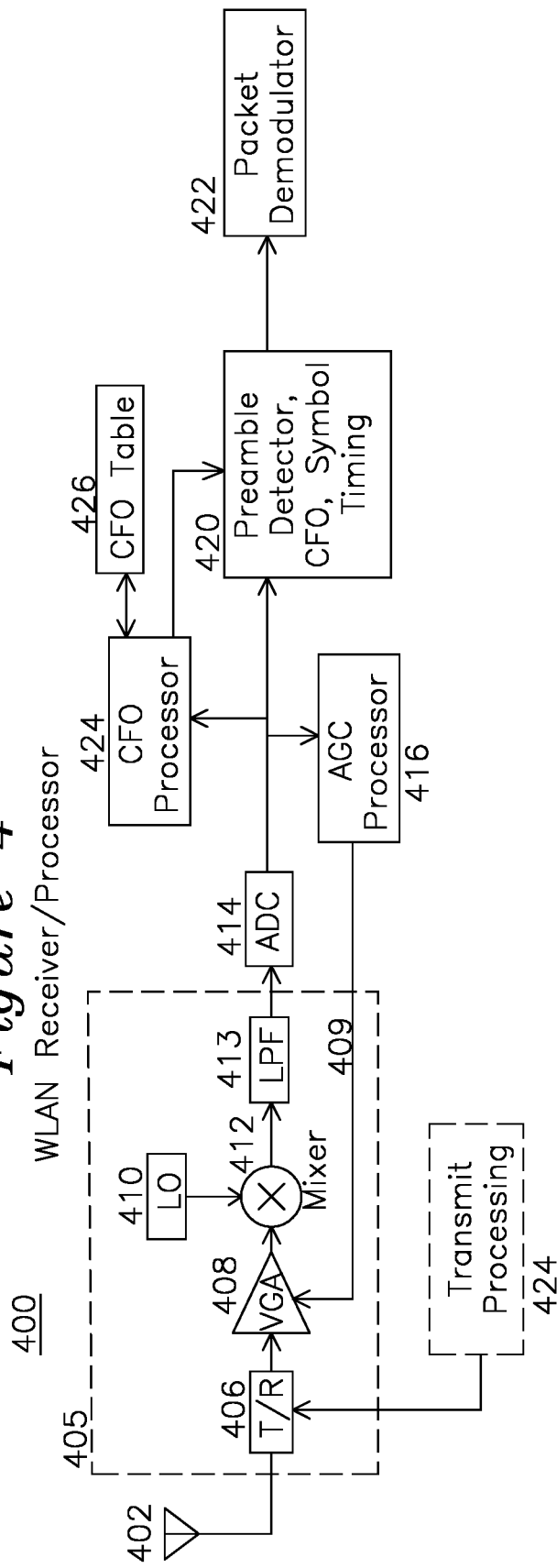

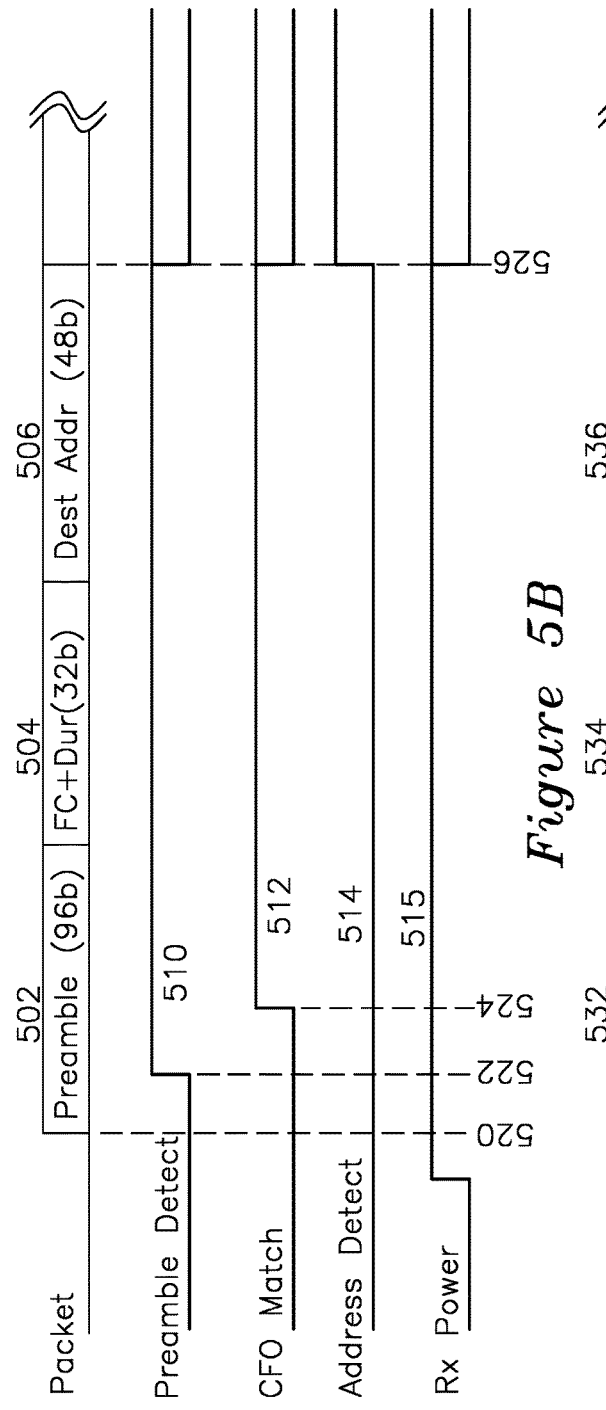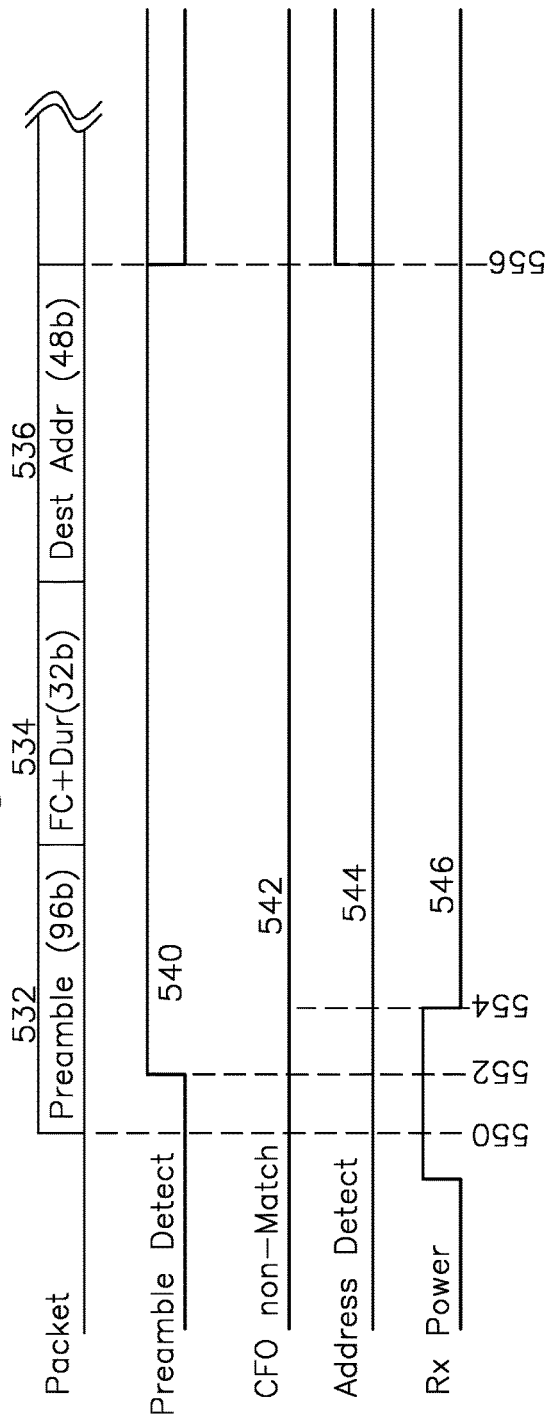

WLAN RECEIVER EARLY POWER DOWN BASED ON CENTER FREQUENCY OFFSET DETECTION

FIELD OF THE INVENTION

The present invention relates to an apparatus and process for reduced power consumption in a station receiving wireless packets, such as a Wireless Local Area Network (WLAN) receiver for a WLAN packet format which includes a preamble and a packet header, the station receiving packets from a particular transmitter such as an access point (AP) in infrastructure mode for any of the several 802.11 WLAN protocols. In the infrastructure mode of 802.11 WLAN, each wireless network comprises a single AP and a plurality of stations associated with the AP by an association protocol under 802.11. In particular, the invention relates to a power-saving wireless receiver for early power down upon receipt of a packet from a different transmitter or access point (AP) than the one or more desired transmitters.

BACKGROUND OF THE INVENTION

WLAN networks typically operate in an infrastructure mode, which include an access point (AP) which is transmitting to a plurality of stations (STA). The access point is typically connected to a gateway router with connectivity to the internet, and because of the need to be available for newly associating stations and to forward traffic received from the internet, the AP is typically connected to a mains power source and continuously operating. By contrast, the various STA receivers of the infrastructure may be battery operated with limited energy, and in a listen mode waiting for a packet transmitted by the AP to one of the stations in the infrastructure, and fully power up only when required. For typical Internet of Things (IoT) stations, a battery with finite energy is the power source, and the less power the IoT STA draws, the longer the battery will last before needing replacement or recharging.

One problem associated with infrastructure mode is that the adjacent APs from unrelated infrastructure networks, as well as a different STA that are in the current infrastructure, may transmit packets that the subject STA receives. Under 802.11 protocols, each packet comprises a preamble followed by a header indicating a target STA, followed by packet payload data. The packet preamble is used for performing automatic gain control of the receiver to set the gain of the Variable Gain Amplifier (VGA), packet detect, establishing symbol boundary timing, and channel compensation. The wireless packet header typically includes a layer 2 destination address (DA) field and also a layer 2 (Media Access Controller) source address (SA) field identifying the transmitter. Whether the packet is intended for the station based on a DA match to the receiving STA is not known until the packet layer 2 DA is received. If the DA is not a match to the STA DA, then the receiver powers down until a future wakeup point, such as one assigned as part of an 802.11 Delivery Traffic Indicator Message (DTIM) AP beacon frame.

A power consumption problem arises in the prior art where the receiver is unable to determine whether a packet is destined for the receiving STA until the DA field is read and compared with the station address, which results in significant power consumption while receiving packets which are not intended for the receiving station. It is desired to provide signal processing for an STA which provides that the STA has a power down capability earlier than decoding the layer 2 packet destination address.

A consequence of performing the AGC process, symbol timing, and symbol processing until the L2 DA field is recovered is that each time a packet is processed which is not intended for the subject station, excess power is consumed. It is desired to provide a receiver which consumes less power when receiving WLAN packets and determining whether the packet is destined for the receiving station than has been provided by the prior art.

OBJECTS OF THE INVENTION

A first object of the invention is an early power down receiver comprising:

an RF front end comprising a variable gain amplifier (VGA) coupled to incoming wireless packets, the RF front end producing a baseband output;

an analog to digital converter (ADC) coupled to the baseband output, the ADC outputting digitized samples;

a Center Frequency Offset (CFO) table containing an association between an access point (AP) and an AP CFO value from at least one previous receive event of a packet from the associated access point;

a center frequency offset (CFO) controller estimating a CFO value during a preamble interval;

the CFO controller configured to generate a comparison value between an estimated CFO value with the AP CFO value from the CFO table;

the RF front end, ADC, and CFO controller powering down until the receipt of a subsequent packet if the comparison value exceeds a threshold.

A second object of the invention is a process for an early power down receiver which receives a wireless packet having a preamble part, a header part, and a packet payload part, the process comprising:

measuring a center frequency offset (CFO) during a preamble part;

retrieving a previous AP CFO value from a CFO table having an association between an access point and an AP CFO for the access point;

comparing the measured CFO with the previous CFO value to generate a comparison result;

powering down the early power down receiver until the arrival of a subsequent packet when the comparison result exceeds a threshold.

SUMMARY OF THE INVENTION

The present invention is directed to Wireless Local Area Networks (WLAN), such as those described in the IEEE standard 802.11-2016. The present invention describes a power saving receiver for receiving wireless packets which include a preamble and a layer 2 destination address (DA) field. A STA, upon association with an access point (AP), captures the Center Frequency Offset (CFO) of the AP during a preamble interval of the packet. In an infrastructure mode, the STA maintains a CFO table containing an AP CFO value for the AP of association and optionally a CFO history. In a peer to peer mode, the STA maintains a CFO table of entries, each entry including a peer and an associated CFO for the peer. After a learning period, during which time the CFO table is created based on an AP of the infrastructure mode or stations of the peering mode, the STA performs an early power down during the preamble interval when the preamble CFO of a received packet varies from a CFO of an AP or peer listed in the CFO table by more than a threshold amount. In this manner, the STA saves power that would have been consumed during the interval between a rejection based on the determination that the CFO does not match a table entry of the current invention and a rejection based on the reception of the full DA of the prior art.

BRIEF DESCRIPTION OF THE DRAWINGS

FIG. 1 shows a prior art Wireless Local Area Network (WLAN) packet format.

FIG. 2 shows the MAC header of FIG. 1.

FIG. 3 shows a timing diagram for a station power down based on reception of a packet destination address.

FIG. 4 shows a block diagram of a receiver according to the present invention.

FIGS. 4A and 4B show example CFO tables maintained by the receiver of FIG. 4.

FIG. 5A shows a timing diagram for the receiver of FIG. 4 during reception of a matching AP or peer.

FIG. 5B shows a timing diagram for the receiver of FIG. 4 during reception of a non-matching AP or peer based on CFO.

DETAILED DESCRIPTION OF THE INVENTION

Figures 6A, 6B:
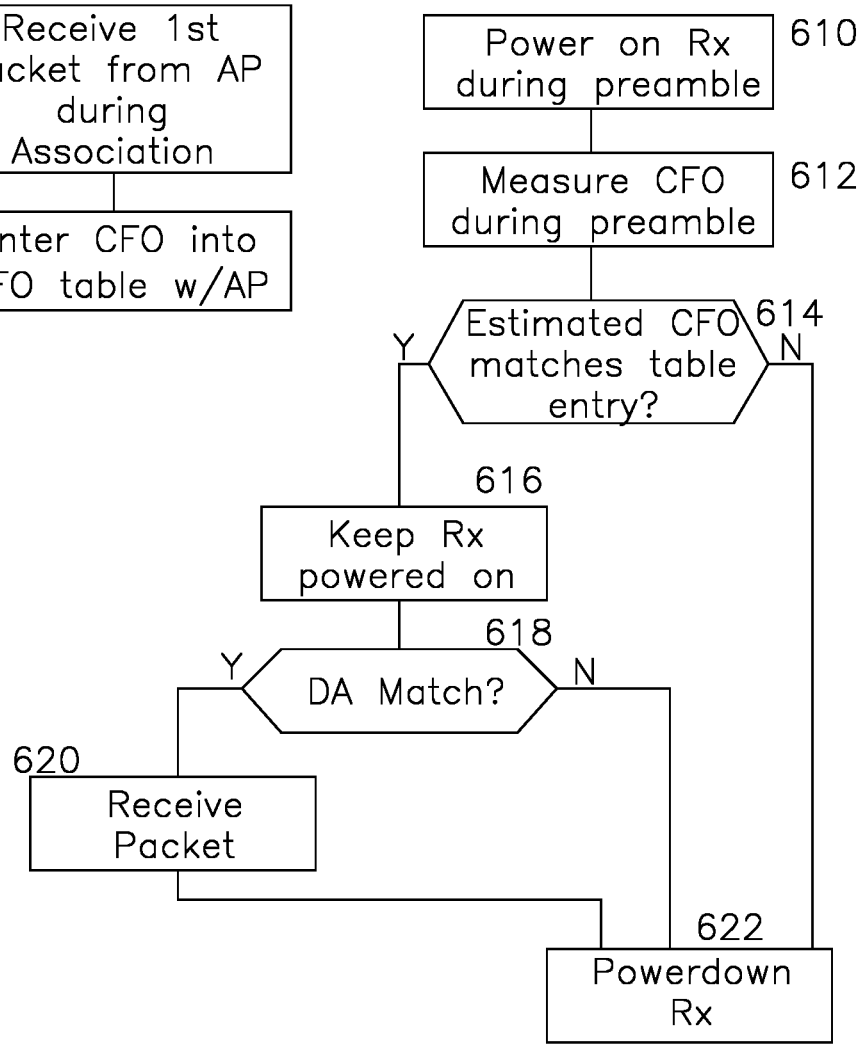
FIG. 6A shows a flowchart for adding an AP identifier and associated CFO to a CFO table.
FIG. 6B shows a flowchart for early power down of a receiver based on CFO estimated during a preamble interval of a packet.

In the present patent application, the presentation of a nominal value x which is "approximately x" is understood to be within the range of +/−20% of x. Similarly, "on the order of x" is understood to include the range x/10 to 10x.

FIG. 1 shows two examples of a preamble/header for a prior art Wireless Local Area Network (WLAN) packet. In one example of a WLAN packet, an 802.11b preamble/header 119 is shown, where the packet modulation type is DSSS (direct sequence spread spectrum) and CCK (Complementary Code Keying), comprising an 80 bit preamble plus 16 bit Start of Frame Delimiter (SFD) 102 followed by a 16 bit header 104 identifying protocol type. In another example of a WLAN packet, an Orthogonal Frequency Division Multiplexed (OFDM) modulated preamble/header 117 for use with 802.11a, 802.11g, 802.11n, 802.11ac, 802.11ax is shown, comprising a series of short training symbols 103, guard interval 105, long training symbols 107, guard interval 109, and a signal field 111, all encoded using OFDM modulation. Generally following the preamble/header of these packet types is mac header 106 and optional link layer control (LLC) field 108, followed by the packet payload 110 and frame check sequence (FCS) 112, using the modulation method for that packet type (DSSS for 802.11b, OFDM for 802.11a, 802.11g, 802.11n, 802.11ac, 802.11ax, and others).

When the preamble/header of FIG. 1 is an OFDM packet, the WLAN frame preamble relies on four full OFDM symbols which remain the same regardless of the mode or MCS link settings. The first section of the OFDM preamble 103 may be identified as the short portion of the preamble, called the Legacy Short Training Field (LSTF) in the IEEE 802.11 standard, contains ten repeated copies of a short sequence. The purpose of this sequence is to allow the automatic gain control (AGC) of the receiver to stabilize over the 8 µs it is given and to perform carrier frequency offset (CFO) estimation which the present invention uses to qualify the sender. Generally, this is known as the packet detection phase of the receiver.

Once the OFDM packet has been detected and CFO qualified as being associated with the expected AP or peer, the CFO may be corrected for symbol extraction and processing by the baseband processor, and the receiver will next utilize a second preamble field section 107 known as the Legacy Long Training Field (LLTF) in the IEEE 802.11 standard, containing two repeated sequences and a cyclic prefix. This second portion 107 of the preamble is designed to be used for channel estimation. In an example of the present invention for OFDM, the OFDM receiver will first identify the start of the packet, examine the center frequency offset and disqualify the packet and power down the receiver if the CFO error exceeds a threshold. If the CFO error is within acceptable limits, the CFO will be corrected as well as channel effects, and remove residual phase distortions prior to decoding the DA fields of the packet header as a secondary verification and to disqualify interferers with the same CFO as the intended AP or STA.

FIG. 2 shows the details of the data link layer 122 fields in the embodiment where the packet format is 802.11b, including Frame Control 240, Duration IDentifier 242, Destination Address (DA) 244, Source Address (SA) 246, Sequence control 248, and various optional fields 250 which depend on frame type.

FIG. 3 shows a timing diagram for a prior art 802.11b STA, which powers up at time 320 and first receives the 96 bit preamble 302 (102 of FIG. 1), asserts a preamble detect at some point 322 after the start of preamble 302, performs AGC and symbol timing operations, and thereafter during 304 and 306 receives the 16 bit header 104, 16 bit frame control 240, 16 bit duration identifier 242, and destination address 244, after which the destination address match at time 324 is asserted. In an embodiment where the STA is configured to receive OFDM modulated packet, the receiver powers up and asserts a preamble detect during 103, performs AGC and coarse symbol timing operations, and thereafter during MAC header 106 receives the 16 bit header 104, 16 bit frame control 240, and destination address 244, after which the destination address match is asserted. Rx power waveform 314 indicates receiver power is applied before the arrival of the packet at interval 320, and remains on to interval 324, at which time the power remains until end of packet if the destination address 306 matches the station address, and if the destination address 206 does not match, the receiver powers down at interval 324.

FIG. 4 shows an example WLAN receiver 400 according to an embodiment of the invention. A front end 405 has a transmit/receive switch 406 which receives wireless signals from antenna 402, and delivers the wireless signals to variable gain amplifier 408, which is coupled to mixer 412 which converts the packets to baseband using local oscillator 410, the baseband output of the mixer 412 coupled to a low pass filter (or bandpass filter) 413, for delivery to an analog to digital converter 414. The output of the ADC 414 is delivered to an AGC processor 416 which iteratively provides a gain control to the VGA 408 during the preamble interval by observation of the sample values output by ADC 414, and to a center frequency offset processor 424, which analyzes the incoming signal during the preamble interval to determine a center frequency offset. The CFO processor 424 also creates an AP CFO entry in the CFO table 426 after confirmation that the layer 2 (L2) Destination Address 244 matches the layer 2 address of the intended station, and that the L2 Source Address corresponds to an expected transmitter for the STA, such as an AP of current 802.11 association.

Determination of a magnitude of CFO offset may be determined from a single mixer output, however it is not possible to resolve a positive CFO from a negative CFO. Determination of a positive or negative CFO requires an analytic signal provided by a quadrature mixer. In one example of the invention providing a positive and negative CFO, a quadrature mixer is used which provides positive and negative CFO values.

In one example of the invention, the AP CFO or the temporal history of CFO for each packet or groups of packets received are used to predict a future expected CFO for use with subsequently received packets. For example, the threshold may adapt to a 0.1 ppm/min offset drift in AP CFO for the AP over time as an ambient temperature increases. In this manner, the reference expected CFO which is compared with the received CFO can be tracked. In one example of the invention, the expected CFO (CFOexpected) has a value:

CFOexpected=CFO[$t$−1]+$tn$*(CFO[$t$−2]−CFO[$t$−1])/$tp$ where:

CFO[t−2] and CFO[t−1] are the previous two CFO samples for the AP, and tn is the duration from the measurement of CFO[t−1] to the time of measurement of the current CFO. tp is the duration between the measurement of CFO[t−2] and CFO[t−1].

The CFO table 426 has entries shown in FIG. 4A, which may include an association of the center frequency offset from the line clock of the STA, with the entries as shown in FIG. 4A.

The early power down receiver of the invention corresponds to a WLAN receiver which can receive at least one of DSSS modulated or OFDM modulated packets. In an embodiment where the receiver is configured to receive a OFDM modulated packet, the CFO estimate is computed for the OFDM packet over 3 or more segments of preamble, each segment being approximately 0.8 us in duration, such as where each segment is formed by short training symbols 103 of FIG. 1. The segments may be contiguous or taken from different non-adjacent intervals of the preamble.

FIG. 4B shows a variation of FIG. 4A which includes a CFO history for use in incorporating temporal drift, such as a startup frequency drift upon turn-on or ambient temperature changes causing a ramp in CFO over time until reaching equilibrium.

FIG. 5A shows a timing diagram for the CFO power down receiver of FIG. 4 for the case of a received packet with a matching CFO in the table. In an embodiment where the receiver is configured to receive a DSSS modulated 802.11*b* packet, a packet preamble 502 is received at time 520, and the center frequency offset of the incoming packet is measured from 520 to 522, the corresponding CFO offset is searched in the table of FIG. 4A, and a match is found at time 524, and the receiver continues to receive the packet, verifying a complete destination address at time 526. Waveform 515 indicates that receiver power remains applied beyond CFO match at time 524 and the next receiver power decision is at time 526, when the destination address 506 is compared. In the case where an adjacent interferer has the same CFO as the intended station, it may be necessary to verify the packet destination address matches the station address at time 556. FIG. 5B shows the corresponding receive event where an adjacent AP which is not the AP of infrastructure association, which results in an early power down after detection of an estimated CFO which exceeds the threshold. In an embodiment where the receiver is configured to receive a DSSS modulated 802.11b packet, FIG. 5B shows the case where a packet preamble 532 is received at time 550, preamble detect is asserted at time 552, but the CFO does not match 542. If a long duration of time has passed since the AP last transmitted, the receiver may optionally remain powered up until time 556 to check the DA, but otherwise, the receiver powers down when the non-match is determined at time 554. Receiver power waveform 546 indicates the application of power prior to the estimated arrival time 550 of the packet, and power is removed at time 554 when a CFO match is not found in the CFO tables of FIGS. 4A and 4B.

FIG. 6A shows a new STA association with an AP adding the step of the CFO processor 424 entering the AP CFO for the AP into the CFO table with AP identifier, such as L2 MAC address. FIG. 6B shows subsequent operations, where the receiver may wake up shortly before an expected packet arrival in step 610, and measure the CFO during a preamble interval 612, and next examine the CFO table in step 614. If the CFO matches within a threshold, or time-compensated estimate of CFO (such as from the table of FIG. 4B) matches within a threshold, or is within an acceptable variation such as 2 ppm, or alternatively a variation which includes a linear time factor to account for drift in CFO over time, the receiver remains powered on in step 616, or if the CFO is outside of the expected range, the receiver powers down 622 until the next wakeup interval when a packet is expected. The Destination Address 615 and Source Address (not shown) match occurs next at 618, followed by packet reception 620, after which the receiver powers down until a subsequent packet arrival time.

The present examples are provided for illustrative purposes only, and are not intended to limit the invention to only the embodiments shown.

I claim:
1. An early power down receiver comprising:
an RF front end comprising a variable gain amplifier (VGA) coupled to incoming wireless packets, the RF front end producing a baseband output;
an analog to digital converter (ADC) coupled to the baseband output, the ADC outputting digitized samples;
a Center Frequency Offset (CFO) table containing an association between an access point (AP) and an AP CFO value from a previous receive event of a packet from an associated access point for at least a previous two received packet preambles from the AP;
a center frequency offset (CFO) controller coupled to the CFO table and to the digitized samples, the CFO controller estimating a current CFO value during a preamble interval;
the CFO controller configured to generate a comparison value between the current CFO value and the AP CFO values from the CFO table;
where the current CFO value is compared with an estimated CFO computed by adding a previous CFO value from the CFO table to a change in CFO per unit time of the at least two previous CFO measurements multiplied by an elapsed time since a previous CFO measurement to form a CFO change estimate, and comparing the CFO changes estimate to the measured CFO; and,
the RF front end, ADC, and CFO controller powering down if the comparison value exceeds a threshold.

2. The early power down receiver of claim 1 where the RF front end VGA output is coupled to a quadrature mixer which generates quadrature baseband signals by mixing with a quadrature local oscillator.

3. The early power down receiver of claim 1 where the local oscillator has a frequency of approximately 2.4 Ghz.

4. The early power down receiver of claim 1 where the AP CFO value is computed from a previous CFO measurement plus an offset based on a CFO drift value per unit time multiplied by a time interval from the previous CFO measurement.

5. The early power down receiver of claim 1 where the threshold is 2 ppm.

6. The early power down receiver of claim 1 where the mixer is a quadrature mixer and the CFO table contains a history of CFO measurements which provide a positive or negative drift per unit time, the positive or negative drift per unit time used to determine the AP CFO value.

7. The early power down receiver of claim 1 where an AGC process is performed before or during a CFO estimate duration.

8. The early power down receiver of claim 1 where the receiver is operative to receive a WLAN packet wherein the WLAN packet comprises at least one of DSSS modulation or OFDM modulation.

9. The early power down receiver of claim 8 where the receiver is operative to receive an OFDM modulated packet, and the current CFO value is computed over 3 or more segments of approximately 0.8 us intervals of the preamble.

10. The early power down receiver of claim 1 where the CFO table includes at least one of an AP CFO and a peer CFO accompanied by a timestamp.

11. A process for an early power down receiver which receives a wireless packet having a preamble part, a header part, and a packet payload part, the process comprising:
    measuring a center frequency offset (CFO) during a preamble part;
    retrieving a at least two previous CFO values from a CFO table, the CFO table having an association between an access point identifier and a CFO estimate for the access point;
    comparing the measured CFO with the at least two previous CFO values for the AP from the CFO table to generate a comparison result;
    where the measured CFO is compared with the CFO estimate by adding a previous CFO value from the CFO table to a change in CFO per unit time of at least two previous CFO measurements multiplied by an elapsed time since a previous CFO measurement to form a CFO change estimate, and comparing the CFO change estimate to the measured CFO to generate a comparison result; and,
    powering down the early power down receiver when the comparison result exceeds a threshold.

12. The process of claim 11 where measuring the CFO is performed using a quadrature mixer which indicates a positive or negative CFO offset.

13. The process of claim 11 where the CFO table contains at least two previous CFO measurements and a time duration between CFO measurements.

14. The process of claim 11 where the CFO estimate is determined in less than 10 segments of a preamble.

15. The process of claim 11 where the received packet is at least one of the protocols: 802.11a, 802.11b, 802.11g, 802.11n, 802.11ac, 802.11af, 802.11ah, 802.11ax and 802.11ba.

16. A CFO estimator for determining whether a preamble was transmitted by a particular access point, the CFO estimator comprising:
    a quadrature mixer receiving preamble RF energy, mixing the RF energy to quadrature baseband signals, the quadrature baseband signals sampled to form quadrature samples;
    a CFO processor coupled to the quadrature samples, the CFO processor measuring a frequency offset value and storing the frequency offset value with a timestamp into a CFO table when the preamble is determined to be from a particular access point, the CFO table storing at least two CFO offset values associated with different received packets for the particular access point;
    the CFO processor also comparing a received preamble CFO with an estimated current CFO derived from the CFO table, the CFO processor issuing a power down signal when the estimated desired current CFO differs from the received preamble CFO by more than a threshold; and,
    the estimated current CFO computed by adding a previous preamble CFO measurement to a desired preamble estimated drift per unit time between previous CFO offset values from the CFO table multiplied by a time duration between the previous CFO offset values.

17. The CFO estimator of claim 16 the preamble is determined to be from the particular AP when a subsequent source address matches an address of the particular access point.

18. The CFO estimator of claim 16 where the mixer is a quadrature mixer and the frequency offset value has a positive or negative value.

19. The CFO estimator of claim 16 where the CFO table has a history of CFO offsets and associated time stamps.

20. The CFO estimator of claim 16 where the preamble is at least one of the protocols: 802.11a, 802.11b, 802.11g, 802.11n, 802.11ac, 802.11af, 802.11ah, 802.11ax and 802.11ba.

* * * * *